United States Patent
Sprengart et al.

(10) Patent No.: US 12,198,558 B2
(45) Date of Patent: Jan. 14, 2025

(54) ADAPTIVE SCHEDULING SYSTEM FOR UNMANNED AERIAL VEHICLES

(71) Applicant: The Boeing Company, Chicago, IL (US)

(72) Inventors: Sebastian Sprengart, Darmstadt (DE); Stefan Neis, Bensheim (DE)

(73) Assignee: THE BOEING COMPANY, Arlington, VA (US)

( * ) Notice: Subject to any disclaimer, the term of this patent is extended or adjusted under 35 U.S.C. 154(b) by 208 days.

(21) Appl. No.: 17/454,647

(22) Filed: Nov. 12, 2021

(65) Prior Publication Data

US 2022/0172629 A1    Jun. 2, 2022

Related U.S. Application Data

(60) Provisional application No. 63/119,112, filed on Nov. 30, 2020.

(51) Int. Cl.
| | | |
|---|---|---|
| G06F 3/0481 | (2022.01) | |
| G05D 1/00 | (2006.01) | |
| G08G 5/00 | (2006.01) | |

(52) U.S. Cl.
CPC ........... *G08G 5/0039* (2013.01); *G05D 1/005* (2013.01); *G05D 1/104* (2013.01); *G06F 3/0481* (2013.01); *B64U 2201/102* (2023.01); *B64U 2201/20* (2023.01)

(58) Field of Classification Search
CPC .. G08G 5/0039; G08G 5/0043; G08G 5/0069; G08G 5/0026; B64C 39/024; G05D 1/005; G05D 1/104; G06F 3/0481; B64U 2201/20; B64U 2201/102
See application file for complete search history.

(56) References Cited

U.S. PATENT DOCUMENTS

| | | | |
|---|---|---|---|
| 9,567,077 B2 * | 2/2017 | Mullan | B64C 39/024 |
| 10,203,701 B2 * | 2/2019 | Kurdi | G05D 1/104 |
| 10,464,579 B2 * | 11/2019 | Cooper | B60L 15/38 |
| 2018/0033312 A1 * | 2/2018 | DeLuca | G08G 5/0017 |
| 2020/0160730 A1 * | 5/2020 | Priest | G08G 5/0013 |

FOREIGN PATENT DOCUMENTS

| | | | | |
|---|---|---|---|---|
| WO | WO-2016154944 A1 * | 10/2016 | | B64C 39/024 |
| WO | WO-2020226908 A1 * | 11/2020 | | G05D 1/042 |

\* cited by examiner

*Primary Examiner* — Anne Marie Antonucci
*Assistant Examiner* — Lidia Kwiatkowska
(74) *Attorney, Agent, or Firm* — MH2 Technology Law Group LLP

(57) ABSTRACT

A system for coordinating operations for a plurality of unmanned aerial vehicles ("UAV") is provided. The system generates a time-based sequence comprising one or more operations for each UAV, each operation including an execution window and a duration, identifies coincident time periods between first and second execution windows, and prepares a modified time-based sequence for each of the plurality of UAVs. The preparing includes setting at least one of a first preferred start time ("PST") for a respective operation within the first execution window and a second PST for a respective operation within the second execution window based on at least the estimated duration of each respective operation and the coincident time periods. The setting is configured to minimize overlap between respective operations within the first and second execution windows. Modified time-based sequences for the plurality of UAVs are then provided to an operator.

20 Claims, 6 Drawing Sheets

ADAPTIVE SCHEDULING SYSTEM FOR UNMANNED AERIAL VEHICLES

CROSS-REFERENCE TO RELATED APPLICATIONS

The present application claims the benefit of U.S. Provisional Application No. 63/119,112, filed Nov. 30, 2020, the disclosure of which is hereby incorporated by reference in its entirety.

FIELD

The present disclosure relates to systems and methods for adaptive scheduling of operational commands for unmanned autonomous aerial vehicles.

BACKGROUND

With the arrival of new aerial vehicle types, such as, for example, unmanned aerial vehicles ("UAV"), including, for example, autonomous unmanned aerial vehicles and/or remotely controlled aerial vehicles, the desire to leverage such UAVs for accomplishing desirable tasks (e.g., cargo delivery, surveillance, etc.) has increased. With the increased desire to utilize such UAVs comes an increased demand for operators trained and capable of controlling the UAVs.

UAVs typically require planning of operations in shared airspace similar to those of manned aerial vehicles, for example, operations involving the use of air traffic control ("ATC") approved flight plans for routing aircraft along ATC coordinated corridors free of terrain, resolution of traffic conflicts by coordinating over existing communication channels, etc. For UAVs, one or more of these operations may involve and/or require intervention from a human operator, while others may be handled autonomously by systems of the UAV itself. For example, airspace clearances, route clearances, etc. may require intervention from an operator for at least the reason that not all information required for the operations can be known from the start of a mission (e.g., changes in weather conditions, route changes for other vehicles in common airspace, etc.). Further, because automatic speech recognition algorithms may not yet be sufficiently accurate for aviation use, UAVs are not yet able to handle communication with air traffic control autonomously, and therefore, human interaction is typically required.

In contrast, many general navigation operations making up a significant portion of the flying time for the UAV may be handled autonomously by systems onboard the UAV. Thus, during periods not involving operator intervention, also referred to as "downtime," the operator is generally unoccupied while awaiting a subsequent operation of a UAV requiring intervention.

SUMMARY

The following presents a simplified summary of the disclosure in order to provide a basic understanding of some aspects of one or more implementations of the present disclosure. This summary is not an extensive overview, nor is it intended to identify key or critical elements of the present disclosure, nor to delineate the scope of the disclosure. Rather, its primary purpose is merely to present one or more concepts in simplified form as a prelude to the detailed description presented later.

The present inventors have recognized that operator utilization and efficiency can be increased by enabling each unmanned aerial vehicle ("UAV") operator to manage multiple UAVs. The inventors have further recognized that when an operator manages multiple UAVs, concurrent operations among the multiple UAVs may exceed the operator's capabilities to successfully manage all assigned vehicles. For example, depending on a number of managed UAVs, it may become difficult or even impossible to perform some operations in parallel for multiple UAVs due to limitations of the operator, the UAVs, etc. Accordingly, the inventors have determined that it is desirable to improve scheduling of operations involving operator intervention for the multiple UAVs managed and controlled by the operator.

According to embodiments of the present disclosure, a computer system for coordinating operations for a plurality of UAVs, is provided. The system includes one or more hardware processors and a non-transitory memory device communicatively connected to the one or more hardware processors and storing instructions executable by the one or more hardware processors to cause the one or more hardware processors to execute functions including, generating, for each of the plurality of UAVs, a time-based sequence comprising one or more operations for a respective UAV, each of the one or more operations comprising an execution window and an estimated duration, identifying one or more coincident time periods between a first execution window within a first time-based sequence for a first UAV of the plurality of UAVs and a second execution window within a second time-based sequence of a second UAV of the plurality of UAVs, and preparing a modified time-based sequence for each of the plurality of UAVs. The preparing includes setting at least one of a first preferred start time ("PST") for a respective operation within the first execution window and a second PST for a respective operation within the second execution window based on at least the estimated duration of each respective operation and the coincident time periods. The setting is configured such that overlap between the respective operation within the first execution window and the respective operation within the second execution window is minimized. The functions further include providing the modified time-based sequence for each of the plurality of UAVs to an operator of the plurality of UAVs.

Because the described system can determine potential time conflicts for a plurality of UAVs in advance and/or in real time, system operator utilization may be improved by allowing an operator to control multiple UAVs, while minimizing the potential for operator overloading and/or operator time conflicts. In addition, by providing the operator with a modified sequence in advance, with the understanding that ad-hoc operations received during a control session will also be similarly scheduled, the operator may further plan for a given workload, and customize the workload as desired. Still further, because the system can allow an operator to intervene on behalf of a plurality of UAVs, integration of UAVs into national airspace systems can be improved, even based on current rules and regulations requiring, for example, human interaction with air traffic control, among others.

Each execution window may be bounded by an earliest start time ("EST") at which the respective operation may commence and a latest end time ("LET") by which the respective operation is to be completed.

Each of the one or more operations may include a tentative start time ("TST") falling at or after the EST and a tentative end time ("TET") falling at or before the LET, the TST being characterized as a time sensitive start time or a time insensitive start time, and the TET being characterized as a time sensitive end time or a time insensitive end time. The setting may be further based on a characterization for at least one of the TST and TET of each of the respective operations.

Each of the modified time-based sequences may be provided to the operator via a graphical user interface ("GUI"), the GUI enabling customization of one or more PSTs.

A time sensitive start time and a time sensitive end time may not be changeable in the GUI, whereas a time insensitive start time and a time insensitive end time may be changeable in the GUI. The preparing function may include changing a PST for a first operation having a time insensitive start time within the first execution window to avoid overlap between the respective operation within the first execution window and the respective operation within the second execution window, and the respective operation within the second execution window may have a time sensitive start time.

Each operation in a respective time-based sequence may correspond to an operator intervention event for a respective UAV.

Each time-based sequence may be generated from mission data corresponding to each of the plurality of UAVs.

The mission data may include one or more of UAV location, a requested flight altitude, an air traffic control ("ATC") clearance requirement, UAV type, an intended route, a trajectory profile, route trajectory change waypoints, longitudinal constraints, latitude constraints, altitude constraints, speed constraints, and weather conditions.

The time-based sequence may be further based on one or more phases of a flight schedule for each of the plurality of UAVs.

The functions may further include updating each time-based sequence in real time to reflect at least one of actual start time, actual completion time, and actual duration of an operation, and recording at least one of the actual start time, actual completion time, and actual duration for each operation executed by the operator.

The functions may further include updating an operator record to reflect at least one of the actual start time, the actual completion time, and the actual duration for each operation in the time-based sequence, and generating a subsequent time-based sequence based on the operator record.

The functions may further include receiving and/or identifying an ad-hoc operation for at least one of the plurality of UAVs, the ad-hoc operation comprising at least one of a time sensitive start time and a time sensitive end time, identifying overlap between the ad-hoc operation and one or more operations of each of the modified time-based sequences for a corresponding UAV of the plurality of UAVs, regenerating each of the modified time-based sequences corresponding to each of the plurality of UAVs based on the ad-hoc operation such that the identified overlap is eliminated.

The functions may further include warning the operator that overlap between two or more operations exists.

The functions may further include determining that overlap between the ad-hoc operation and one or more operations of each of the modified time-based sequences for a corresponding UAV of the plurality of UAVs cannot be eliminated, and transitioning responsibility of the UAV for which the ad-hoc operation was received to an operator other than the operator of the plurality of UAVs.

The computer system may further include one or more displays configured to display at least one of the time-based sequence for each of the plurality of UAVs, the modified time-based sequence for each of the plurality of UAVs, and operation details for a specific operation to the operator of the plurality of UAVs.

Operation complexity may be determined for each respective operation, and the determined operation complexity considered during the preparing. For example, operation complexity may have an impact on at least one of an estimated duration for an operation, and a calculated workload for an operator.

According to further embodiments of the present disclosure, a method for coordinating operations for a plurality of unmanned aerial vehicles ("UAV") is provided. The method includes generating, for each of the plurality of UAVs, a time-based sequence comprising one or more operations for a respective UAV, each of the one or more operations comprising an execution window and an estimated duration, identifying one or more coincident time periods between a first execution window within a first time-based sequence for a first UAV of the plurality of UAVs and a second execution window within a second time-based sequence of a second UAV of the plurality of UAVs, and preparing a modified time-based sequence for each of the plurality of UAVs. The preparing includes setting at least one of a first preferred start time ("PST") for a respective operation within the first execution window and a second PST for a respective operation within the second execution window based on at least the estimated duration of each respective operation and the coincident time periods, and the setting is configured such that overlap between the respective operation within the first execution window and the respective operation within the second execution window is minimized. The modified time-based sequence for each of the plurality of UAVs is provided to an operator of the plurality of UAVs.

Each execution window may be bounded by an earliest start time ("EST") at which the respective operation may commence and a latest end time ("LET") by which the respective operation is to be completed.

Each of the one or more operations may include a tentative start time ("TST") falling at or after the EST and a tentative end time ("TET") falling at or before the LET, the TST being characterized as a time sensitive start time or a time insensitive start time, and the TET being characterized as a time sensitive end time or a time insensitive end time. The setting may include setting the at least one of the first preferred start time ("PST") for a respective operation within the first execution window and the second PST for the respective operation within the second execution window further based on a characterization for each of the TST and TET of the respective operations.

The method may further include receiving and/or identifying an ad-hoc operation for at least one of the plurality of UAVs, the ad-hoc operation comprising at least one of a time sensitive start time and a time sensitive end time, identifying overlap between the ad-hoc operation and one or more operations of each of the modified time-based sequences for a corresponding UAV of the plurality of UAVs, and regenerating each of the modified time-based sequences corresponding to each of the plurality of UAVs based on the ad-hoc operation such that the identified overlap is eliminated.

The method may further include warning the operator that overlap between two or more operations exists.

Operation complexity may be determined for each respective operation, and the determined operation complexity considered during the preparing.

According to yet further embodiments of the present disclosure, a non-transitory computer readable medium that stores instructions that when executed by a hardware process performs a method coordinating operations for a plurality of unmanned aerial vehicles ("UAV"), is provided. The method includes generating, for each of the plurality of UAVs, a time-based sequence comprising one or more operations for a respective UAV, each of the one or more operations comprising an execution window and an estimated duration, the execution window being bounded by an earliest start time ("EST") at which the respective operation may commence and a latest end time ("LET") by which the respective operation is to be completed, identifying one or more coincident time periods between a first execution window within a first time-based sequence for a first UAV of the plurality of UAVs and a second execution window within a second time-based sequence of a second UAV of the plurality of UAVs, and preparing a modified time-based sequence for each of the plurality of UAVs. The preparing includes setting at least one of a first preferred start time ("PST") for a respective operation within the first execution window and a second PST for a respective operation within the second execution window based on at least the estimated duration of each respective operation and the coincident time periods. The setting is configured such that overlap between the respective operation within the first execution window and the respective operation within the second execution window is minimized. The method further includes providing the modified time-based sequence for each of the plurality of UAVs to an operator of the plurality of UAVs.

It is intended that combinations of the above-described elements and those within the specification may be made, except where otherwise contradictory.

It is to be understood that both the foregoing general description and the following detailed description are exemplary and explanatory only and are not to be considered limiting.

BRIEF DESCRIPTION OF THE FIGURES

The accompanying drawings, which are incorporated in, and constitute a part of, this specification, illustrate implementations of the present teachings and, together with the description, serve to explain the principles of the disclosure.

It should be noted that some details of the figures have been simplified and are drawn to facilitate understanding of the present teachings rather than to maintain strict structural accuracy, detail, and scale.

DETAILED DESCRIPTION

Reference will now be made in detail to illustrative implementations of the present disclosure, examples of which are illustrated in the accompanying drawings. Wherever convenient, the same reference numbers will be used throughout the drawings to refer to the same or like elements (e.g., components, steps, processes, or parts).

Generally speaking, examples of the present disclosure relate to methods, computer systems, and computer-readable media that store instructions for facilitating simultaneous mission management and control for multiple unmanned aerial vehicles ("UAV"). A mission can be characterized by a plurality of flight phases, including preflight, taxi-out, takeoff, departure, cruise, arrival, landing, taxi-in, and post-flight, among others. UAVs of the present disclosure involve minimal direct interaction during a mission, with only strategic guidance and input typically being provided by an operator. Such inputs are grouped as time-related operations for each vehicle's mission. Doing this for multiple vehicles allows an operator to better plan their workload and enables management of multiple UAVs simultaneously.

Figure 1:
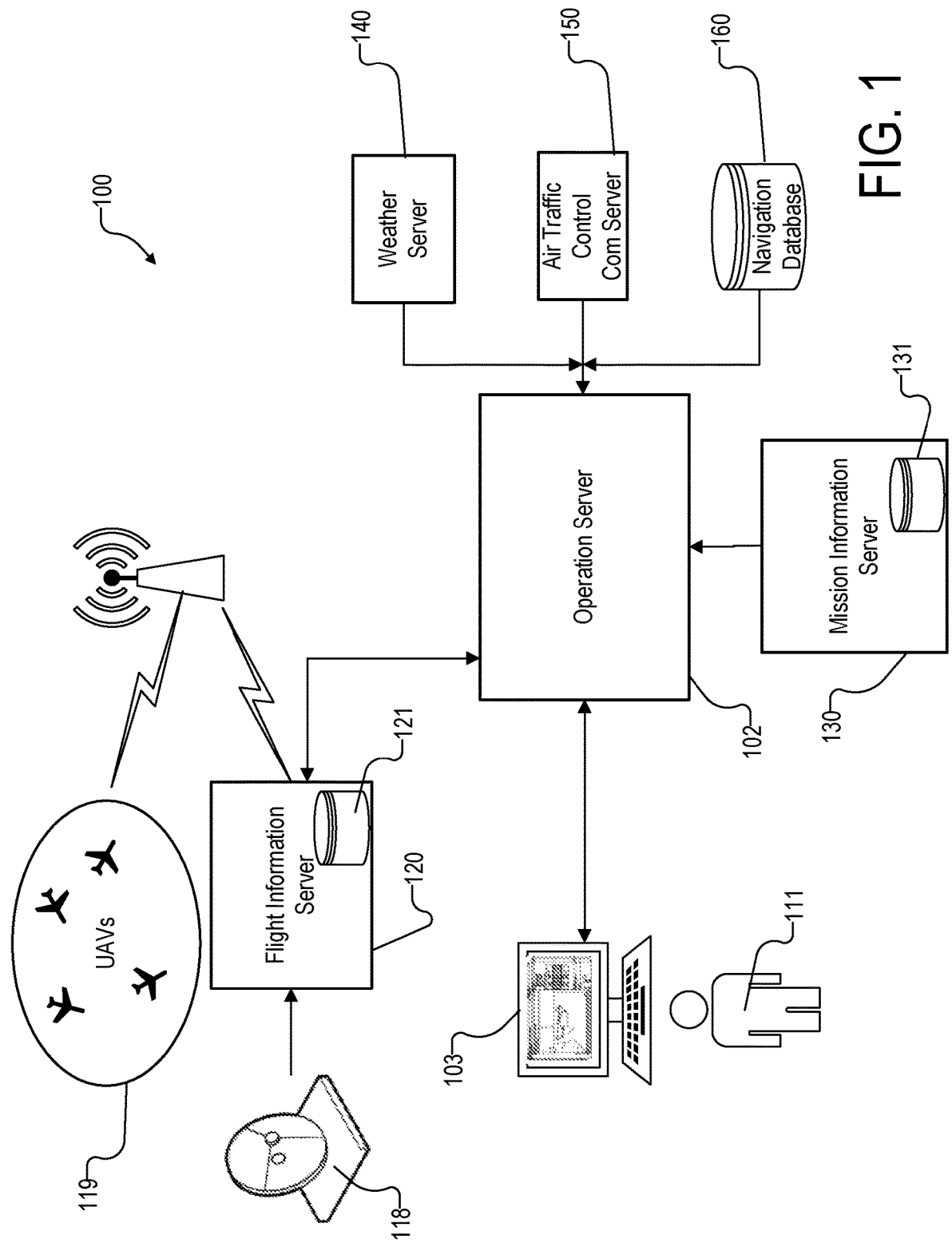
FIG. 1 is diagram representing a high level, general overview of a control system for a plurality of unmanned aerial vehicles ("UAV") according to embodiments of the present disclosure.

FIG. 1 is a high level, general overview of a control system 100 for a plurality of UAVs 119 according to embodiments of the present disclosure. The control system 100 includes an operation server 102, a machine-user interface 103, a flight information server 120, a mission information server 130, a weather server 140, an air traffic control ("ATC") communication server 150, and a navigation server 160, among others.

Weather server 140 may be implemented on any suitable computing device and is configured to provide weather data related to one or more routes over which a UAV 119 is planned to travel (e.g., based on a UAV mission.) According to some examples, weather server 140 may be implemented as a third-party service, such that a request for weather data in an area to be traversed by a UAV 119 may be transmitted (e.g., by operation server 102) to weather server 140 and the associated weather data subsequently received by the transmitting server (e.g., operation server 102, flight information server 120, etc.) Various third-party services may be available as of the filing date of the present application, for example, the application programming interface ("API") service of the United States National Weather Service, aviationweather.gov, or private providers (e.g. Boeing Global Services). Weather data associated with weather server 140 may be requested and received in any suitable format, for example, XML, JSON, HTML, etc.

Navigation database 160 may be configured to store data related to published aeronautical fixes and routes throughout a desired airspace (e.g., airspace corresponding to a travel path of a UAV 119), and to provide such route data to the operation server 102, among others. For example, the data may be stored and provided in one or more of the Aeronautical Radio, Incorporated (ARINC) standard, an international navigation system databases standard, or other suitable standard configured to provide data related to published routes over, for example, a one way communication channel to operation server 102, among others. Requests for published routes may be made by, for example operation server 102 based on an origination and destination of a UAV 119 to be controlled, among others. Navigation database 160 may further include information related to, for example, ATC clearances required along a particular route, ATC controlling authorities along each route, general usage levels for each route, waypoints along each route, etc.

Air traffic control communication server 150 may be configured to transmit, receive, and process communication to and from ATC, for example, via voice data, digital data, etc. For example, in advance of a UAV mission, a flight plan may be filed for each UAV 119, the flight plan being defined by one or more waypoints associated with the mission. Authorizations determined as necessary and/or desired from various ATC entities for traveling via the flight plan waypoints (e.g., as determined based on data from navigation database 160) may then be obtained by air traffic control communication server 150 from, for example, an air navigation services provider for the respective airspace (e.g., FAA in the USA, Nav Canada in Canada, etc.). The obtained clearances in turn provide an ATC cleared trajectory for a UAV mission, and this ATC cleared trajectory can be notified to operation server 102, for example, to enable determination and transmitting of vehicle trajectory operation commands to a respective UAV 119.

Air traffic control server 150 may also be configured to receive from ATC, and to transmit to, for example, operation server 102, ad-hoc ATC operation requests during a UAV mission associated with a UAV 119. For example, go-around requests, traffic avoidance requests, holding pattern requests, etc. may give rise to an operation involving operator intervention, and may be received ad-hoc (i.e., without advance warning or planning) from ATC. Upon receipt of such an ad-hoc request from ATC, air traffic control server 150 may be configured to transmit such a request to operation server 102 for scheduling of the one or more operations associated with the ad-hoc request for an operator.

Flight information server 120 may be implemented on any suitable computing device and may be configured to receive and provide flight data (e.g., real time) related to flight status of a plurality of UAVs 119. For example, flight information server 120 may be configured to act as an interface between UAVs 119 and operation server 102 by receiving information transmitted by each of the UAVs 119 (e.g., UAV current location, a requested flight altitude, an ATC clearance requirement, UAV type, an intended route, a trajectory profile, route trajectory change waypoints, longitudinal constraints, latitude constraints, altitude constraints, speed constraints, wind speed, and wind direction, etc.), processing the information (e.g., unpacking, timestamping, translating, etc.) and forwarding the information to operation server 102, among others. Examples of flight data provided herein are intended as illustrative only, and not intended to be limiting. Any flight data related to a UAV 119 may be included in flight data provided by flight information server 120, and implementations with fewer data points for flight data are also to be considered as falling within the scope of the present disclosure.

Similarly, flight information server 120 may be configured to, for example, receive operational commands from operation server 102, process the information (e.g., timestamping, translating, packaging, etc.) and transmit the operational commands corresponding to a mission operation to a respective UAV 119.

Flight information sever 120 may be configured to maintain contact, at least intermittently, with the UAVs 119 and to receive data during an entire flight for each UAV 119. For example, applications such as ForeFlight and/or subscription services such as those provided by Jeppesen or Garmin may be implemented to enable data from UAVs 119 to be captured by flight information server 120.

Flight information server 120 may also communicate with various other components of system 100, such as, for example, operation server 102, weather server 140, and air traffic control server 150, among others, to obtain information that may impact flight (e.g., weather information) of a UAV 119.

Flight information sever 120 may further be configured to receive real-time surveillance data from a surveillance system 118 comprising, for example, one or more of radar systems, automatic dependent surveillance—broadcast ("ADS-B") systems, automatic dependent surveillance—contract ("ADS-C") systems, etc. Surveillance data provided by surveillance system 118 may provide flight information server 120 with additional "vision" with regard to a UAV 119, e.g., views of a UAV trajectory profile, via a one-way communication channel. Flight information sever 120 may be configured to use such data to determine a time at which to transmit data instructions (e.g., as a result of operations) to a UAV 119, for example, before reaching a waypoint from a plurality of waypoints associated with a flight path determined based on navigation database 160. Flight information server 120 may further implement, for example, a prediction algorithm and one or more of the following: weather data from weather server 140, system and navigation data obtained from UAV 119, and the flight data from other UAVs 119 to determine when to transmit the data instructions. In some examples, flight information sever 120 may be configured to perform functions by comparing a current location of a UAV 119 with a planned location based on the flight plan or latest ATC clearance updates (i.e., active flight clearance).

Flight information sever 120 may further be configured to provide trajectory predictions for each UAV 119 in the plurality of UAVs 119 as described in U.S. Pat. No. 8,818,576 titled "Tailored arrivals allocation system trajectory predictor" issued on Aug. 26, 2014, which is commonly owned with the present application and the entire contents of which are incorporated herein by reference. Particularly, column 7, line 10 to column 8, line 21, describe additional features of such a flight information sever 120.

Flight information sever 120 may include a trajectory profile database 121 storing trajectory profile data, a number of performance models for various UAVs, among others, and a trajectory predictor engine (not shown) implementing, for example, a point mass model for kinematic systems of equations.

Flight information sever 120 may be configured to produce, for example, four-dimensional trajectory predictions, or four-dimensional trajectory solutions, by analyzing a number of factors including, for example, UAV preference information, applicable route and airspace constraints, environmental information, timing of uplink commands, and aircraft intent, among others. A four-dimensional trajectory prediction shall be understood to be a trajectory prediction for a UAV 119 that provides information in the four dimensions of latitude, longitude, altitude, and time.

Mission information server 130, and components thereof, may be implemented on any suitable computing device and may be configured to receive and store information related to one or more missions and associated flight phases for one or more UAVs 119 to be controlled.

Mission information server 130 may include a mission database 131 configured to store the mission information, including, for example, origination location, destination location, planned take-off time, planned routes (e.g., based on navigation database 160), ATC clearance requirements, expected UAV progress along the associated route, anticipated route updates, etc. For example, mission database 131 may store flight phase information for each flight phase of a UAV 119, and each mission and associated flight phase may include a plurality of operations to be carried out for each UAV 119. For example, for a preflight phase, the operations can include the following: check that aircraft and systems are ready, plan the flight, file flight plan with air traffic control, upload flight plan, communicate with ground personnel and execute command handover from ground crew to ground station operator, and start engines, among others. For a taxi-out phase, the operations can include the following: enter taxi-out route, obtain taxi clearance from air traffic control, check taxi-out, monitor taxi-out process, switch to tower frequency, obtain runway line-up clearance, check runway and approach path clear, and initiate runway line-up, among others. For a takeoff phase, the operations can include obtain takeoff clearance, initiate take-off, monitor take-off run, and monitor aircraft configuration for climb out, among others. For a departure phase, the operations can include monitor aircraft systems and status and change radio frequency and perform sector handovers, among others. For a cruise phase, the operations can include monitor aircraft systems and status, change radio frequency and perform sector handovers, and monitor environment/update flight plan accordingly, among others. For an arrival phase, the operations can include monitor aircraft systems and status, enter arrival route/update arrival plan, and change radio frequency and perform sector handover, among others. For a landing phase, the operations can include monitor aircraft systems and status, switch to tower frequency, obtain landing clearance, and initiate landing, among others. For a taxi-in phase, the operations can include obtain taxi route and parking position from air traffic control ("ATC"), enter taxi-in route, switch to ground operations frequency, obtain taxi clearance from air traffic control, check taxi path clear, initiate taxi-in, and monitor taxi-in process, among others. For a postflight phase, the operations can include park aircraft, shutoff engines, perform handover of responsibility to ground crew, and update aircraft logbook (advise maintenance items, etc.), among others. Of course, additional operations may be associated with one or more aforementioned flight phases, and the operations noted above may be associated with different phases than as noted, or with multiple phases, and so forth.

Mission information server 130, and associated mission database 131 may further store information related to each operation, for example, complexity, timing information (e.g., start time, end time, duration, etc.), whether the operation is optional, etc. For example, each operation record stored in mission database 131 may include an earliest start time and a latest end time, which together define an execution window for the operation, i.e., a time period during which the operation must be started and completed, as well an expected duration for the operation corresponding to an estimated time cost for an operator to perform the operation within the execution window.

Mission database 131 may further store a tentative start time falling at or after the earliest start time associated with an operation, and a tentative end time falling at or before the latest end time associated with the operation. Each of the tentative start time and the tentative end time may be characterized as "time sensitive" or "time insensitive." For purposes of the present disclosure, a time-sensitive time shall be understood to mean an immutable time, within a predetermined threshold (e.g., ±5 percent of the operation duration), that must be taken into consideration when preparing a time-based sequence of operations, and at which the associated operation must either commence or be completed by. For example, for an operation having a time-sensitive start time of 500 seconds following commencement of a mission, and an estimated duration of 120 seconds, the operation must start at between 494 and 506 seconds from mission commencement. Similarly, an operation having a time-sensitive end time of 2000 seconds from mission commencement, and an estimated duration of 400 seconds, the operation must end at between 1980 second and 2020 seconds from commencement of the mission.

Notably, an operation may be deemed time sensitive as a result of various factors, including, but not limited to, airport traffic flows, predicted take-off and landing times, and sequence, etc. In other words, where a third-party, such as ATC or other aircraft in the same or related airspace would be required to wait for an operation to be completed, such operations may be classified as time sensitive.

Further, time-sensitivity may be dependent on one or more additional considerations. For example, a UAV 119 may only takeoff when a takeoff clearance has been received from ATC. Therefore, when a time-sensitive operation is initially planned for 500 seconds following mission commencement, operation server 102 may be configured to adapt the time-based sequence for the case where the ATC clearance has been delayed, thereby increasing a "listening" time for the operator performing the operation. Other such modifications are contemplated and intended to fall within the scope of the present disclosure.

In contrast, and for purposes of the present disclosure, a time-insensitive time shall be understood to mean a flexible time that may be taken as a suggestion when preparing a time-based sequence of operations. In other words, an operation having a time insensitive start time may be programmed to start at any time within the defined execution window, taking into account the operation's estimated duration. Similarly, for an operation having a time insensitive end time may be programmed to start at any time within the defined execution window, taking into account the operation's estimated duration. For example, for an operation having a time insensitive start time and an estimated duration of 120 seconds, the operations may be programed to begin anywhere within the associated execution window up to 120 seconds before the latest end time associated with the operation. Such programming may also take into account additional factors, such as, for example, operation complexity, operation environment (e.g. traffic density at UAV location), and historical data on the operation, where available.

Notably, time information stored for operations in mission database 131 may be indicated as a relative time to a predetermined point in time and/or as an absolute time, for example, when a mission in mission database 131 has a fixed starting time. According to some examples, earliest start time and latest end time may be indicated as a number of seconds since a beginning of the mission. According to another example, the predetermined point in time may be indicated relative to a beginning time of the flight phase in which the operation is to be carried out. According to yet other examples, each time may be an actual time as measured based on a local time server, for example, 4:00 PM eastern standard time. Actual time and/or any suitable time reference may be implemented as a reference point from which start, end, and duration times are measured without departing from the scope of the present disclosure.

Table 1 provides an illustrative listing of operations characterized as having time insensitive times (column 1) and time-sensitive times (column 2).

TABLE 1

Example time sensitive and insensitive operations

| Example operations with "time insensitive" execution times: | Example operations with "time-sensitive" execution times: |
|---|---|
| Initial command of flight plan & performing other pre-flight actions | Line-up and take-off clearance requests & execution |
| ATC-request and input taxi-out routes | Initiate landing |
| Optimization of flight path (e.g. for performance reasons, or environmental conditions such as weather en-route) | Automatically generated operations to resolve contingencies (emergency situations) |
| ATC-sector handovers | Ad-hoc occurring ATC requests/instructions for which an operation is automatically generated (e.g. to avoid traffic or initiate go-around) |
| Enter standard instrument departure and standard terminal arrival routes | |
| Performing post-flight actions | |
| Handoff of mission/aircraft to another operator | |

Complexity of an operation may be determined based on various factors associated with the execution of the operation and may be included in determining an estimated duration for a given operation. According to some embodiments, an amount of information used to complete an operation may be included in the determination of a complexity value for an operation. For example, replanning a mission due to a weather event may be considered more complex than commanding a UAV to proceed with a landing approach, and therefore, the complexity value for a replan would be higher, and so too the estimated duration.

According to some embodiments, a number of sources from which the information for carrying out an operation must be collected may be included in the determination of a complexity value for an operation. For example, collecting information from a single source such as an approach chart may be easier than contacting a plurality of sources to find a suitable alternative airport, and therefore a single source information collection operation may have a lower complexity value, and so too would the estimated duration be lower.

According to some embodiments, time pressure associated with an operation may be included in the determination of a complexity value for an operation. For example, an immediate response to ATC may introduce a higher workload than a route optimization due within at 20 minutes from the current time, and therefore, the immediate ATC response operation may have a higher complexity value, and so too would the estimated duration be higher.

According to some embodiments, number and complexity of internal and external dependencies may be included in the determination of a complexity value for an operation. Dependencies may include, for example, finding suitable alternate airport after airspace closure, obtaining a landing clearance, etc. An operation having more external dependencies may, therefore, have a higher complexity value, and likewise the estimated duration. Of course, the examples described above for determining complexity values are intended as illustrative only and should not be considered to be limiting. Moreover, one or more factors may be included in the determination of a complexity value for an operation without departing from the scope of the present disclosure.

Operations and associated complexity for a given UAV 119 can vary depending on a particular mission, and aspects of each operation within a flight phase may be modified based on information provided from, for example, flight information server 120, weather server 140, air traffic control communications server 150, navigation database 160, and flight information sever 120, among others.

Not all operations related to a certain flight phase necessarily occur during the flight phase and may instead occur in phases before and after the actual associated flight phase. For example, an operation related to obtaining takeoff clearance could be performed during the previous flight phase (i.e., taxi-out), but is related to the takeoff phase. Operation duration and frequency at which an operation occurs during a specific mission may depend on various factors, such as: time of day, planned flight route, operation complexity, type of aircraft, and/or weather, among others.

Operation server 102 may be implemented by one or more suitable computing devices and may be configured to perform various functions associated with embodiments of the present disclosure. For example, the operation server 102 may be configured to receive data from other components of the system 100 (e.g., mission information server 130, navigation database 160, air traffic control 150, weather server 140, and Flight information sever 120, etc.) and to prepare and modify time-based sequences of operations for a plurality of UAVs 119 being controlled by an operator. The term "control" as used herein with regard to a UAV should be understood to mean providing occasional user input enabling a UAV to accomplish operations associated with a flight phase of a mission, and is not intended to refer to remote or direct piloting of a UAV by an operator.

Operation server 102 may be configured to enable input from and output to an operator 111 of a plurality of UAVs 119 controlled by the operator 111. Therefore, operation server 102 may be configured to provide a machine-human interface 103 configured to receive operator input and transmit operator input to operation server 102, as well as providing output from operation server 102 to the operator 111, via, for example, a display and a graphical user interface ("GUI") provided on the display.

In addition to information related to flight of a plurality of UAVs 119, machine-human interface 103 may be configured to provide an operator with one or more time-based sequences of operations to be carried out for the plurality of UAVs 119 under the operator's control, as well as to receive operator input associated with execution of the operations in a plurality of time-based sequences for a plurality of UAVs 119.

According to embodiments of the present disclosure operation server 102 may be configured provide multiple types of information to an operator via the human-machine interface 103. For example, flight information 110 associated with a UAV, such as for example, trajectory information, location information, active and past flight clearance data, estimated time of arrival ("ETA"), requested time of arrival ("RTA"), etc. In addition, time-based sequences of operations for each of a plurality of UAVs controlled by an operator may be provided to the operator via machine-human interface 103 based on data provided by operation server 102. For example, an operator controlling four UAVs 119 may be provided with four distinct time-based sequences of operations, each time-based sequence corresponding to operations for a particular UAV 119 under the operator's control. Various examples of the number of UAVs 119 controlled by a single operator may be discussed herein, however, these examples are not intended to be limiting, and any number of UAVs may be controlled by a single operator 111 based on, for example, complexity of various missions carried out by the plurality of UAVs 119, durations of the corresponding operation, and operator experience level, among others.

Notably, because actions of an operator 111 may be performed via machine-user interface 103 and transmitted to operation server 102, metrics of such actions of the operator may be recorded, and obtaining a data foundation including, for example, average duration of typical operations, actual start and end times, etc. on an operator basis may be built. This in turn may enable refinement of estimated durations, start times, and end times for various operations in mission database 131, and thereby, more accurate time-based sequences to be provided to an operator 111. In other words, where an operation has been estimated to have a duration of 120 seconds to completion, but where data shows that the operation is actually completed in 90 seconds, mission planning server 130 may reduce the estimated duration for the operation to 90 seconds in mission database 131 for future mission plans. Similarly, where data shows an average completion time of 150 seconds for the operation, mission planning server 130 may increase the estimated duration for the operation to 150 seconds in mission database 131 for future mission plans.

In order to build the described data foundation, initial studies of operators rating their subjective workload may be undertaken, and the results matched with a rate of change in average operation execution/completion time. Techniques from based on supervised machine learning and human factors evaluations can be used to then update the time components and/or complexity values associated with operations, and these updated can then be stored in mission database 131. Such modification of time elements associated with an operation may be made for all operators or may be made on a per operator basis.

Further, such metric data can also be used to monitor an operator while performing their duty and to evaluate the operator during or following one or more missions. If the average operation execution time during an operator's working shift increases, it may be determined that the operator 111 is experiencing higher workload levels leading to a performance decrement or that an operator is getting tired, for example. Based on a determination as to the condition and/or skill level of the operator 111, the system 100 (e.g., operation server 102) may propose countermeasures to aid the operator 111 such as, for example, handing off one or more UAVs 119 to another operator, prioritizing operations on a UAV basis (e.g., a UAV operating aircraft in distress has higher priority than normally operating UAV), and automatically rescheduling non-priority operations to a later time, among others.

Figure 2:
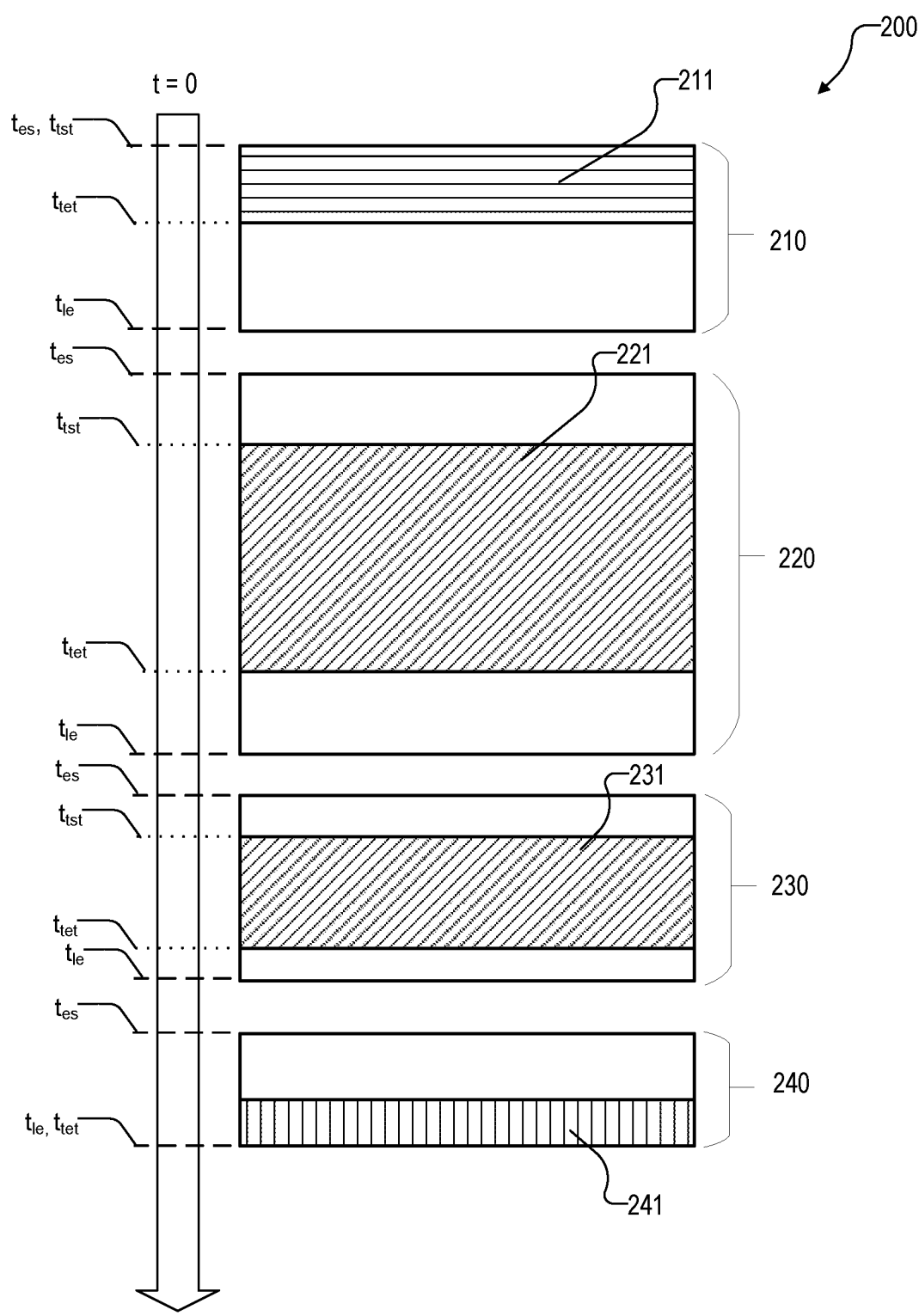
FIG. 2 shows an example of a time-based sequence for one mission corresponding to a single UAV, and illustrates a distribution of mission operations for the UAV over time, according to examples of the present disclosure.

FIG. 2 shows an example of a time-based sequence 200 for one mission corresponding to a single UAV 119 and illustrates a distribution of mission operations for the UAV 119 over time, according to examples of the present disclosure. The illustrative mission of FIG. 2 comprises a total of four operations, however, more or fewer operations may be included in a UAV mission depending on various factors of the mission (e.g., distance to be travelled, task carried out, complexity, etc.)

The time-based sequence 200 may be presented via machine-user interface 103 to illustrate a distribution of operations over time t to an operator 111. As shown at FIG. 2, the vertical axis represents time t, each larger rectangle represents an execution window 210, 220, 230, 240 for a single operation as defined by an earliest start time $t_{es}$ and a latest end time $t_{le}$, and each cross-hatched rectangle within each execution window represents the estimated duration of an operation 211, 221, 231, 241 to be executed, as well as the associated tentative start time $t_{tst}$ and tentative end time $t_{tet}$ as initially set based on a mission plan from mission information server 130. Blank spaces between operations 211, 221, 231, 241, both within and outside of the execution windows represent time in which the operator is free from control of the associated UAV 119, i.e., time during which the UAV is theoretically operating autonomously and without need of operator intervention.

Each operation 211, 221, 231, 241 in FIG. 2 is cross-hatched to illustrate time-sensitive and time-insensitive start and end times for a respective operation. The cross-hatching pattern of operation 211 (i.e., horizontal lines) is used to indicate an operation having a time-sensitive start time, i.e., the tentative start time $t_{tst}$ for the operation must occur within a predetermined threshold time of the tentative start time $t_{tst}$. The cross-hatching pattern of operations 221 and 231 (i.e., diagonal lines) is used to indicate an operation for which both the tentative start time $t_{tst}$ and the tentative end time $t_{tet}$ are time insensitive, i.e., that the operation may be commenced at time falling anywhere within the execution window 220 or 230, provided the estimated duration will not cause the operation to extend beyond the latest end time $t_{le}$. The cross-hatching pattern of operation 241 (i.e., vertical lines) is used to indicate an operation for which the tentative end time $t_{tet}$ is time sensitive, i.e., the operation must terminate within a predetermined threshold time of the tentative end time $t_{tet}$. These cross-hatching patterns will be used throughout this disclosure to indicate the same category of operation, i.e., time sensitive or time insensitive.

During preparation of the time-based sequence of operations 200 for a UAV 119, operation server 102 may receive input from other components of the system 100, such as, for example, weather server 140 and air traffic control communication server 150, among others. It is to be further understood that, while a time-based sequence may be comprised of predetermined operations stored in mission database 131, each time-based sequence may be updated in real time. For example, one or more of the operations within the time-based sequence 200 may also correspond to ad-hoc operations (e.g., an emergency ATC request, changing weather conditions, modified UAV trajectory information, etc.) that have been received and added into the time-based sequence 200, e.g., real time. Operation server 102 is configured to adapt a time-based sequence based on real-time reception and/or deterimination of ad-hoc operations in a similar manner to that described below to modification of time-based sequences.

According to further examples, operation server 102 may be advised that an original destination airport for a UAV 110 has closed, and therefore, previously scheduled landing are no longer valid. Operation server 102 may then be configured to determine an updated destination airport (e.g., via communication with ATC via air traffic control communication server 150) and update the corresponding time-based sequence with new execution windows and operations corresponding to the updated destination airport. According to still further examples, where, for example, weather server 140 indicates to operation server 102 that winds along a planned route for a UAV 119 have changed (e.g., increased or decreased headwind velocity), operation server may take such changes into account and may updated the corresponding time-based sequence in real time. For example, where headwinds have increased in velocity, landing time as well as clearances along the route may be pushed back in time and other operations for other UAVs 119 modified accordingly to reduce or even eliminate resulting overlap. Other examples resulting in real-time updates by operation server 102 may include, for example, take-off delays, unplanned ATC reroutes, etc.

The time-based sequence 200 may be displayed to an operator 111 via, for example, the GUI provided by machine-user interface 103, or by any other suitable means. The time-based sequence 200 may be provided alone or may be provided in parallel with other information related to a plurality of UAVs 119 controlled by operator 111. For example, the time-based sequence 200 may be displayed along with flight information highlights for the corresponding UAV 119, a video feed from the corresponding UAV 119, map-based positioning of the UAV 119, etc. Alternatively, or in addition, the time-based sequence 200 may be displayed alongside one or more additional time-based sequences associated with other UAVs 119 being controlled by the operator 111, thereby forming a "work queue" for the operator 111.

Figure 3:
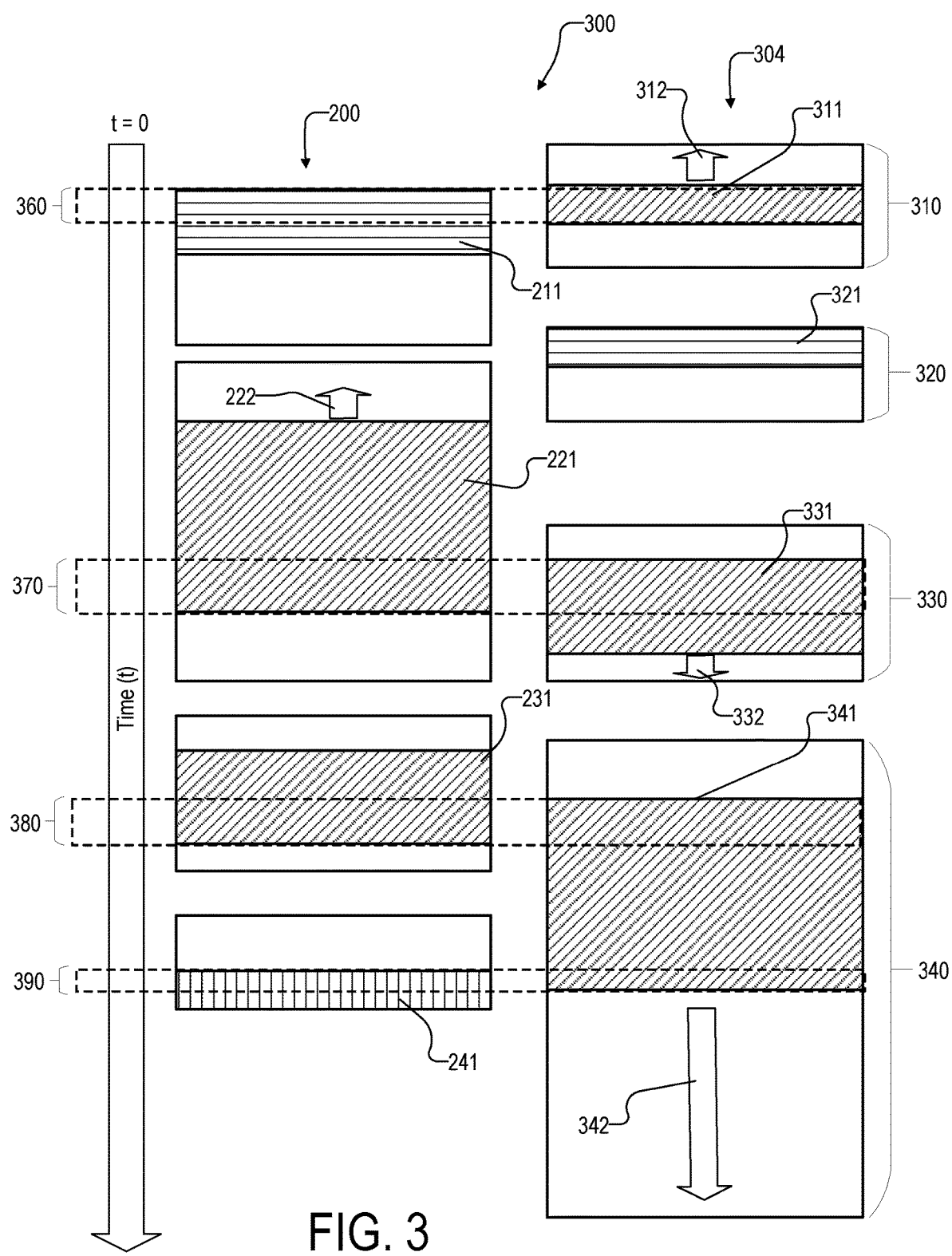
FIG. 3 shows an example operator work queue for two UAV missions that are to be executed in parallel by an operator, according to embodiments of the present disclosure.

FIG. 3 shows an example of such an operator work queue 300 corresponding to two time-based sequences, the time-based sequence 200 for a first UAV mission discussed at FIG. 2, and a second time-based sequence 304 corresponding to a second UAV mission, and having execution windows 310, 320, 330, and 340, with corresponding operations 311, 321, 331, and 341. Each operation 311, 321, 331, and 341 include respective tentative start and end times within a respective execution window 310, 320, 330, and 340. Each of the two time-based sequences 200 and 304 are intended to be executed in parallel by an operator 111, according to embodiments of the present disclosure.

Operator work queue 300 may be provided via the GUI on the machine-user interface 103, or by any other suitable manner, and may illustrate a distribution of operations across missions for the two UAVs 119, and shows where overlap (identified as 360, 370, 380, and 390 in FIG. 3) between operations within various execution windows may occur. The term "overlap," as used herein, shall be understood to mean a segment of time wherein two operations are scheduled to be carried out simultaneously by a single operator. For example, execution window 210 and execution window 310 share a portion of time along the time axis, and respective operation 211, which has a time-sensitive start time, can be seen to have an overlap 360 with operation 311, which is time insensitive. Similarly, execution window 220 shares time along the time axis with both execution window 320 and execution window 330. However, while the operation 321 associated with execution window 320, which is also time sensitive, does not, upon initial consideration, overlap with the operation 221 of execution window 220, which is time insensitive, time-insensitive operation 331 within operation window 330 does have overlap 370 with operation 221 within execution window 220. Overlaps 380 and 390 can be similarly determined by operation server 102.

According to some embodiments, operation server 102 may be configured to identify the overlap between operations and to alert the operator of, or otherwise draw attention of the operator 111 to the presence of such overlap. For example, operation server 102 may provide different shading and/or highlighting of portions of overlapping operations in the GUI to draw an operator's attention to the overlap. Additionally, or as an alternative, rectangles such as those shown at FIG. 3 may be provided on the GUI display to draw the operator's attention. Any suitable method for highlighting the overlaps and/or drawing operator attention thereto (e.g., sound and/or haptic based alerts) may be implemented without departing from the scope of the present disclosure.

Operation server may provide an option to operator 111 to manually adjust the operator work queue to reduce or eliminate the overlap. For example, within the GUI, each time-insensitive operation may be movable (e.g., drag-and-drop) within its respective execution window to allow an operator to move operations around and determine various work queue configurations that may be desirable. Conversely, time-sensitive operations may be fixed in the GUI such that an operator may be prohibited from moving (e.g., via drag-and-drop) a time-sensitive operation from its time sensitive point.

According to some embodiments, an operator 111 may modify a duration of an operation, for example, where the operator believes he may be able to perform the operation in less time than the estimated duration. For example, an operation in time-based sequence 200 having a time-sensitive start time (e.g., operation 211) may have its duration shortened to reduce overlap between the operation in time-based sequence 200 and another operation in time-based sequence 304.

Operation server 102 may be configured to prohibit changes in duration greater than a predetermined amount (e.g., ±5 percent of the estimated duration). This predetermined amount may be constant for all UAVs and/or operators, or variable for certain UAVs and/or operators. In embodiments in which the predetermined amount may vary among different operators, factors for determining this variability may include the level of training and/or experience of the operator, the number of UAVs currently being monitored by the operator, and so forth.

In addition, it may be possible for operation server 102 to "lock" duration for an operation having a complexity value exceeding a threshold value. For example, where a complexity value for an operation exceeds a predetermined threshold value, duration of that operation may be immutable.

According to some embodiments, overlap may be determined to be "significant" requiring action to reduce or eliminate the overlap, or as "insignificant" whereby it may be assumed that an operator 111 may compensate for the overlap without adjustment to a time-based sequence. Significant overlap may be determined when, for example, the amount of time contained within the overlap exceeds a predetermined threshold amount of time. For example, a predetermined threshold amount of time may correspond to a percentage (e.g., 2 percent) of a duration associated with one or more of the operations (e.g., percentage of the durations of the overlapping events summed together.) Such an example is intended to be exemplary only and is not to be considered limiting. Insignificant overlap may then be considered to occur where the amount of time contained within the overlap is less than the predetermined threshold amount of time.

Operation server 102 may be further configured to prepare a modified time-based sequence for each mission associated with a UAV 119, to minimize, or even eliminate overlap between operations in the operator work queue 300, for example, automatically or in response to operator input indicating a desire for performance of such a task. For example, operation server 102 may determine a modification plan involving modification of one or more time-based sequences to optimize (e.g., reschedule) operations across a plurality of UAV missions that the operator is managing. Such a plan may be prepared by, for example, using another available time range within the execution window in which an operation must be executed. In preparing the modification plan, operation server 102 may, for example, set a first preferred start time $t_{ps}$ for a respective operation within a first execution window and/or a second preferred start time $t_{ps}$ for a respective operation within the second execution window based on at least the estimated duration of each respective operation and the determined overlap, such that the overlap is minimized or eliminated.

An illustrative modification plan determined by operation server 102 may be illustrated as shown by the modification arrows 222, 312, 332, and 342. For example, because operation 221 is time-insensitive, operation server 102 may set a preferred start time $t_{ps}$ for operation 221 to an earlier start time than its tentative start time $t_{st}$ (see modification arrow 222) to add additional open time within execution window 220. Similarly, operation server 102 may set a preferred start time $t_{ps}$ for time-insensitive operation 331 later than its tentative start time $t_{st}$ (see modification arrow 332), thereby eliminating overlap 370.

Further, because operation 211 has a time-sensitive start time, and therefore, cannot be moved to a later preferred start time $t_{ps}$, operation server 102 may set a preferred start time $t_{ps}$ for operation 311 to an earliest start time test within execution window 310 (see modification arrow 312) to minimize overlap with operation 211 thereby substantially eliminating overlap 360. Similarly, because operation 241 has a time-sensitive end time, operation server may set a preferred start time $t_{ps}$ for operation 341 to a time falling after the time-sensitive end time of operation 241 (see modification arrow 342).

The modification plan prepared by operation server 102 may be provided to an operator 111 via the GUI on machine-user interface 103, in advance of performing the modification, for example, to allow for operator approval of the proposed modifications. Alternatively, or in addition, the modification plan may be carried out automatically by operation server 102 regardless of any input from an operator 111, for example, after a predetermined period of time has elapsed since display of the proposed modifications. Automatic performance of the modification plan may be particularly desirable where one or more ad-hoc operations are to be added to one or more mission plans by operation server 102, thereby involving modification of one or more time based sequences to reduce or eliminate overlap, if any, caused by addition of the ad-hoc operation.

Figure 4:
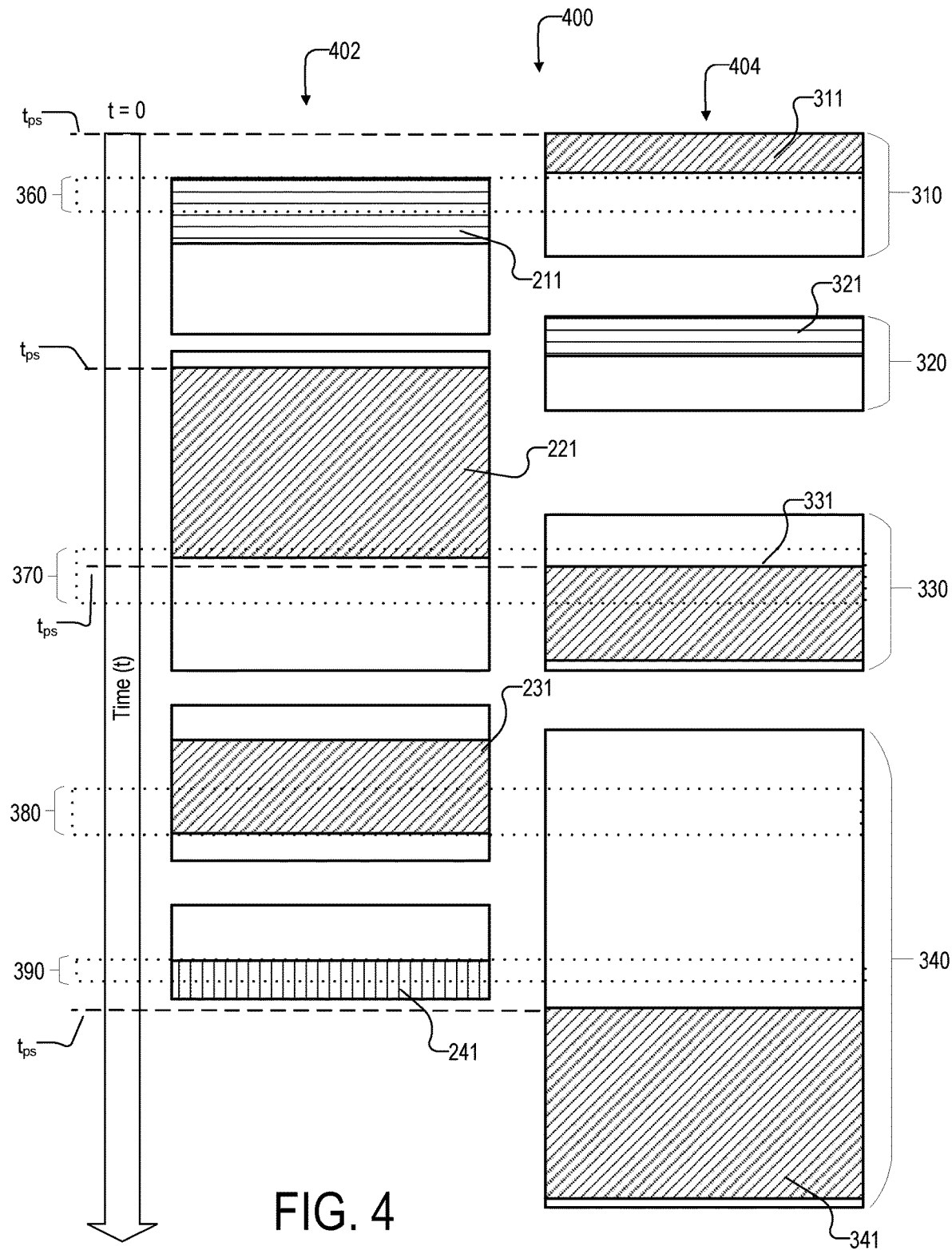
FIG. 4 shows a modified operator work queue including modified time-based sequences for two UAV missions according to examples of the present disclosure.

FIG. 4 shows a modified operator work queue 400 including modified time-based sequences 402 and 404 for a plurality of UAV missions according to examples of the present disclosure. Overlaps previously present in operator work queue 300 are highlighted in dotted lines, and as can be seen, the overlaps have been substantially eliminated from the operator work queue 400 based on the modifications performed by operation server 102. As noted above, by setting a preferred start time $t_{ps}$ for time-insensitive operations, the workload for a plurality of UAVs 119 to be controlled by an operator can be balanced.

Additional techniques and considerations may also be used for performing modifications by operation server 102. Additional considerations may include, for example, minimizing operation switching between UAVs 119 to avoid operator confusion, deliberate switching between UAVs to make use of available synergies (e.g., registering many aircraft flying in the same airspace to the same ATC controller and/or requesting taxi routes for multiple aircraft parked in the same area bound for the same departure runway), and prioritization of operations from an autonomously operating aircraft in distress (e.g. failure condition, fire, severe weather, etc.) through automatically rescheduling non-priority operations to a later time.

During preparation of the modified time-based sequences and/or during the actual mission (e.g., following receipt of an ad-hoc operation request), the operation server 102 may account for dependencies between operations of one or more time-based sequences, and both time insensitive and time-sensitive start- and end times for operations may be updated automatically in real time by operation server 102 based on, for example, mission progress, ad-hoc operation requests, etc.

In some instances, and depending on the mission plans for the plurality of UAVs 119 controlled by an operator 111, it may not be possible to sufficiently reduce or eliminate overlap in operations between time-based sequences (i.e., where no resolution for overlap can be identified based on execution windows, time sensitivity, and operation duration). When such a situation occurs, operation server 102 may be configured to initiate a handoff, either temporary or permanent, of one or more of the plurality of UAVs 119 for which the overlap could not be resolved, to another operator 111. When determining an operator to whom the UAV 119 being transferred should be assigned, operation server 102 may take into account various factors, such as, for example, workloads placed on other operators 111, possible overlaps with operations in other time-based sequences assigned to other operators 111 (e.g., using similar overlap determination techniques as described with regard to the first operator 111), and operator skill level, among others. For example, operation server 102 may be configured to select an operator for the handoff based on a Pareto optimality algorithm based on highest load reduction and best schedule fit for a second operator.

Handoff by operation server 102 may be performed automatically or may be performed in response to operator input following a notification from operation server 102 that such overlap is unavoidable. For example, upon determining that significant overlap cannot be resolved, an operator 111 may be notified that one or more UAVs 119 will be handed off to a backup operator 111. If no response is received from the operator 111 within a predetermined amount of time, the hand off may be performed automatically.

As noted above, operations for a mission are not limited to predetermined operations stored in mission database 131. During UAV missions one or more ad-hoc operations may be requested, for example, based on a request from ATC, changing weather conditions as received from weather server 140, a change in flight characteristics of a UAV 119 as determined from flight information server 120, etc. Operation server 102 may be configured to receive or otherwise identify such ad-hoc operations for at least one of the plurality of UAVs 119 controlled by an operator 111, and to add such ad-hoc operations to the respective time-based sequence in the operator work queues 300 or 400.

In order to add an ad-hoc operation to a time-based or modified time-based sequence, operation server 102 may determine whether the one or more ad-hoc operations include a time sensitive start time and/or a time sensitive end time. Operation server 102 may then analyze the operator work queue assigned to the operator 111 controlling the UAV 119 for which the ad-hoc operation was received to determine if overlap between the ad-hoc operation and one or more operations of each of the modified time-based sequences 402, 404 for a corresponding UAV 119 of the plurality of UAVs 119. If overlap exists, operation server may regenerate one or more of the modified time-based sequences corresponding to each of the plurality of UAVs based on the times and duration associated with the ad-hoc operation such that the identified overlap is eliminated.

Figure 5:
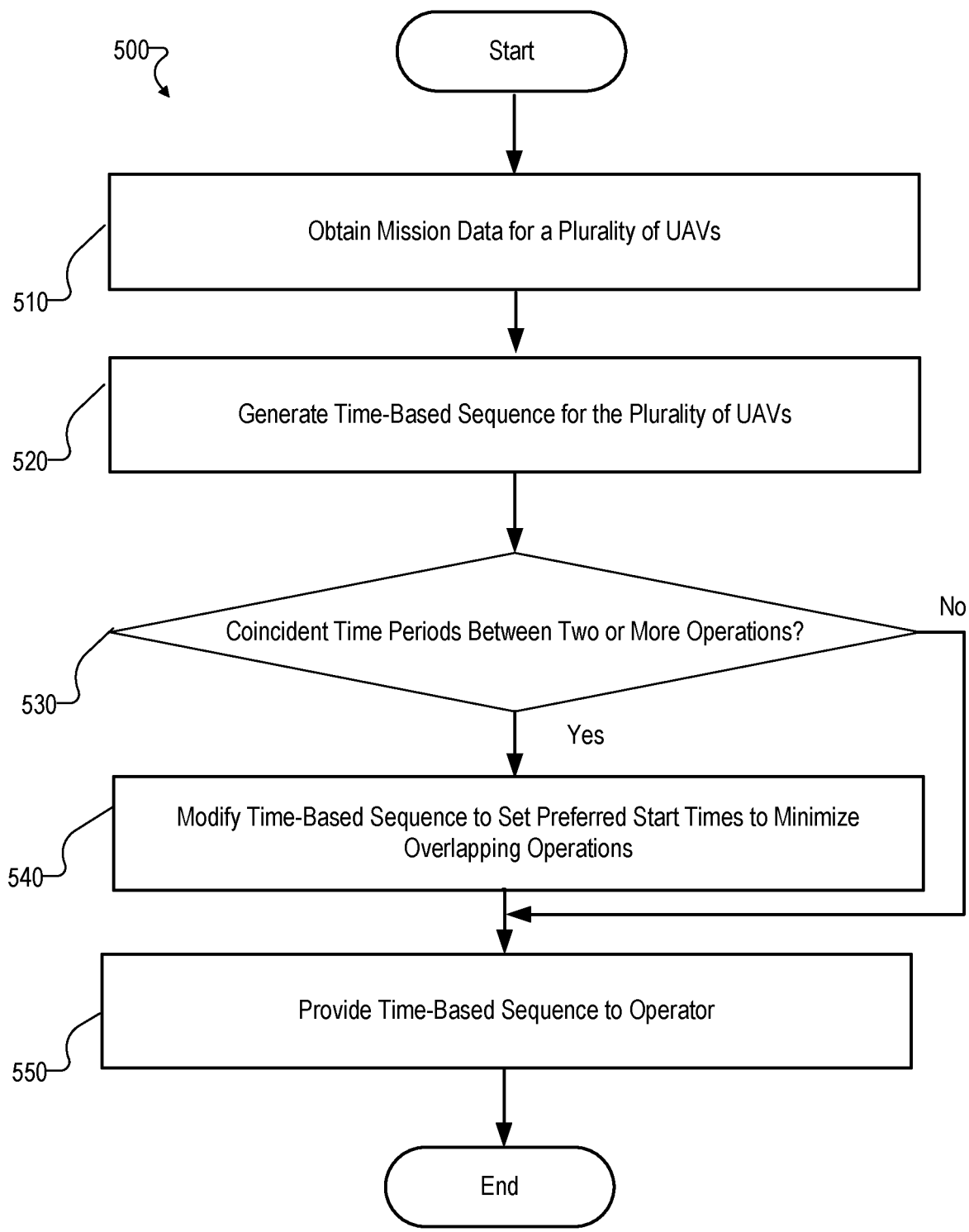
FIG. 5 shows a computer-implemented method for coordinating multiple operations for more than one UAV for an operator, according to examples of the present disclosure.

FIG. 5 shows a computer-implemented method 500 for coordinating multiple operations for more than one UAV 119 for an operator, according to examples of the present disclosure. Operation server 102 may first obtain mission data for the plurality of UAVs 119 to be controlled by an operator 111 from mission planning server 130 (step 510). For example, once an assignment of a plurality of UAVs 119 has been made to an operator 111, operation server 102 may request from mission planning server 130 a listing of operations for each of the UAVs 119 to be controlled based on an intended mission, and may assign each of the plurality of operations to its respective UAV 119.

Operation server 102 may then generate a time-based sequence 200 for each of the plurality of UAVs 119 and their associated mission plans using the listing of operations provided by mission planning server 130. For example, operation server 102 may prepare an initial time-based sequence 200 for each UAV 119 based on the default time data (e.g., tentative start, tentative end, and estimated duration times) associated with each operation in a respective operation listing. When preparing the time-based sequences, operation server 102 may also take into consideration complexity values associated with the operations in the listing provided by mission planning server 130, and may adapt default durations based on the complexity values, and, for example, operator statistics (e.g., average completion time for similar operations by same operator 111). Operation server 102 may also take into consideration additional information received from, for example, weather server 140, air traffic control communication server 150, and/or navigation database 160 to adapt the initial time-based sequence for each UAV 119 to be controlled.

Operation server 102 may then determine whether one or more overlapping time periods exist between time-based sequences of the plurality of UAVs 119 (step 530). For example, operation server may determine whether, based on operation duration, start time, and time sensitivity, one or more operations between the plurality of UAVs 119 overlap in time, leading to intended simultaneous execution of such operations by an operator 111.

If no overlap exists, or if any overlap is such that it may be deemed insignificant (e.g., less than a predetermined threshold percentage of, for example, operation duration) (step 530: no), operation server 102 may present the time-based sequences for the plurality of UAVs 119 to the operator 111 as a work queue 400 (step 550).

When operation server 102 determines that significant overlap occurs (e.g., greater than a predetermined threshold percentage of, for example, operation duration) (step 530: yes) operation server 102 may prepare one or more modified time-based sequences by, for example, setting preferred start times for time-insensitive operations such that overlap is minimized or eliminated (step 540). For example, operation server 102 may change a time insensitive start time for a first operation of a first UAV 119 such that, based on the estimated duration associated with the operation, overlap with a previously overlapping time sensitive start or end time for a second operation of a second UAV 119 is minimized (e.g., reduced to insignificant overlap status) or even eliminated.

According to some embodiments, during preparation of the one or more modified time-based sequences, operation server 102 may be configured to undertake measures to provide an operator 111 with additional time to perform one or more operations for a UAV 119. For example, where operation server 102 determines that one or more execution windows for operations associated with a first UAV 119 result in a difficult workload for an operator 111, operation server 102 may insert additional less intensive operations into a time-based sequence for second UAV 119 controlled by the same operator 111 to increase time between overlaps. According to such an example, operation server 102 may insert operations such as a hold into the time-based sequence for the second UAV 119, the hold allowing the second UAV 119 to navigate the hold autonomously, while granting additional time to carry out more intensive operations for the first UAV 119. Such a technique may be particularly useful when, for example, the second UAV 119 is operating in airspace where limited or no clearances are required, thereby involving fewer additional operations from the operator 111 to achieve the delay.

The time-based sequences thus prepared by operation server 102 may then be provided as a work queue 400 to the operator 111 controlling the plurality of UAVs 119 (step 550). For example, the work queue 400 may be provided via the GUI on a display associated with machine-user interface 103, and may be enabled for "drilling down" allowing the operator to view details of each operation in the work queue (e.g., preferred start time, original tentative start time, duration, description, etc.)

As previously noted, upon receipt of one or more ad-hoc operation requests, certain steps of method 500 may be repeated (e.g., steps 520-550) to enable adding of the ad-hoc operation requests to the operator work queue 400.

Figure 6:
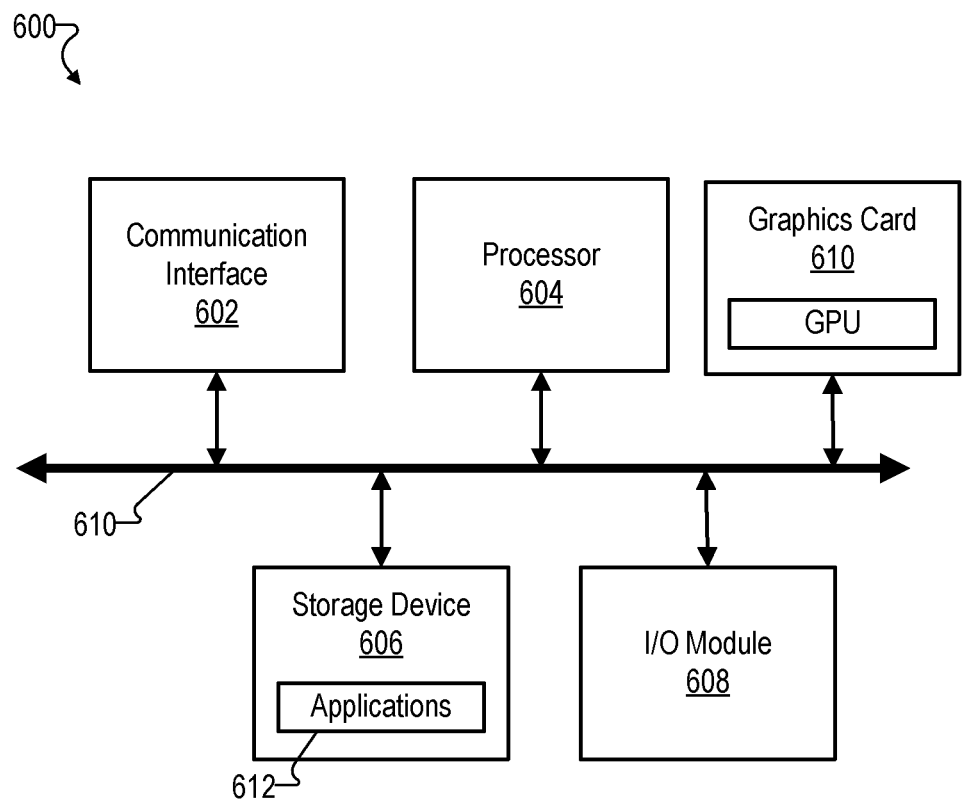
FIG. 6 illustrates an exemplary computing device 600 that may be specifically configured to perform one or more of the processes described herein.

FIG. 6 illustrates an exemplary computing device 600 that may be specifically configured to perform one or more of the processes described herein. For example, one or more computing devices 600 may be implemented as operation server 102, flight information server 120, mission server 130, weather server 140, air traffic control communication server 150, and navigation database 160, among others.

As shown in FIG. 6, computing device 600 may include a communication interface 602, a processor 604, a storage device 606, and an input/output ("I/O") module 608 communicatively connected via a communication infrastructure 610. While an exemplary computing device 600 is shown in FIG. 6, the components illustrated in FIG. 6 are not intended to be limiting. Additional or alternative components may be used in other embodiments.

Communication interface 602 may be configured to communicate with one or more computing devices. Examples of communication interface 602 include, without limitation, a wired network interface (such as a network interface card), a wireless network interface (such as a wireless network interface card), a modem, an audio/video connection, and any other suitable interface.

Processor 604 generally represents any type or form of processing unit capable of processing data or interpreting, executing, and/or directing execution of one or more of the instructions, processes, and/or operations described herein. Processor 604 may direct execution of operations in accordance with one or more applications 612 or other computer-executable instructions such as may be stored in storage device 606 or another computer-readable medium.

Storage device 606 may include one or more data storage media, devices, or configurations and may employ any type, form, and combination of data storage media and/or device. For example, storage device 606 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 606. For example, data representative of one or more executable applications 612 configured to direct processor 604 to perform any of the operations described herein may be stored within storage device 606. In some examples, data may be arranged in one or more databases residing within storage device 606.

I/O module 608 may include one or more I/O modules configured to receive user input and provide user output. One or more I/O modules may be used to receive input. I/O module 608 may include any hardware, firmware, software, or combination thereof supportive of input and output capabilities. For example, I/O module 608 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 608 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 608 is configured to provide graphical data to a display for presentation to a user. The graphical data may be representative of one or more graphical user interfaces and/or any other graphical content as may serve a particular implementation.

In implementations, the components of computer device 600 as described above need not be enclosed within a single enclosure or even located in close proximity to one another. Those skilled in the art will appreciate that the above-described componentry are examples only, as computer device 600 can include any type of hardware componentry, including any necessary accompanying firmware or software, for performing the disclosed implementations. Computer device 600 can also be implemented in part or in whole by electronic circuit components or processors, such as application-specific integrated circuits (ASICs) or field-programmable gate arrays (FPGAs).

In one or more examples, the functions described can be implemented in hardware, software, firmware, or any combination thereof. If implemented in software, functions described in the present disclosure can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

The foregoing description is illustrative, and variations in configuration and implementation can occur to persons skilled in the art.

Further, the disclosure comprises embodiments according to the following clauses:

Clause 1. A computer system for coordinating operations for a plurality of unmanned aerial vehicles ("UAV"), the system comprising:
one or more hardware processors;
a non-transitory memory device communicatively connected to the one or more hardware processors and storing instructions that when executed by the one or more hardware processors cause the one or more hardware processors to execute functions comprising:
generating, for each of the plurality of UAVs, a time-based sequence comprising one or more operations for a respective UAV, each of the one or more operations comprising an execution window and an estimated duration;
identifying one or more coincident time periods between a first execution window within a first time-based sequence for a first UAV of the plurality of UAVs and a second execution window within a second time-based sequence of a second UAV of the plurality of UAVs;
preparing a modified time-based sequence for each of the plurality of UAVs, the preparing comprising:
setting at least one of a first preferred start time ("PST") for a respective operation within the first execution window and a second PST for a respective operation within the second execution window based on at least the estimated duration of each respective operation and the coincident time periods,
wherein the setting is configured such that overlap between the respective operation within the first execution window and the respective operation within the second execution window is minimized; and
providing the modified time-based sequence for each of the plurality of UAVs to an operator of the plurality of UAVs.

Clause 2. The computer system of clause 1, wherein each execution window is bounded by an earliest start time ("EST") at which the respective operation may commence and a latest end time ("LET") by which the respective operation is to be completed.

Clause 3. The computer system of clause 2, wherein each of the one or more operations comprises a tentative start time ("TST") falling at or after the EST and a tentative end time ("TET") falling at or before the LET, the TST being characterized as a time sensitive start time or a time insensitive start time, and the TET being characterized as a time sensitive end time or a time insensitive end time, and
wherein the setting is further based on a characterization for at least one of the TST and TET of each of the respective operations.

Clause 4. The computer system of clause 3, wherein each of the modified time-based sequences are provided to the operator via a graphical user interface ("GUI"), the GUI enabling customization of one or more PSTs and/or an operation duration.

Clause 5. The computer system of clause 4, wherein a time sensitive start time and a time sensitive end time are not changeable in the GUI, and wherein a time insensitive start time and a time insensitive end time are changeable in the GUI.

Clause 6. The computer system of any of clauses 1-5, wherein each operation in a respective time-based sequence corresponds to an operator intervention event for a respective UAV.

Clause 7. The computer system of any of clauses 1-6, wherein each time-based sequence is generated from flight data corresponding to each of the plurality of UAVs.

Clause 8. The computer system of clause 7, wherein the flight data comprises one or more of UAV location, a requested flight altitude, an air traffic control ("ATC") clearance requirement, UAV type, an intended route, a trajectory profile, route trajectory change waypoints, longitudinal constraints, latitude constraints, altitude constraints, speed constraints, wind speed, and wind direction.

Clause 9. The computer system of any of clauses 3-8, wherein the functions further comprise:
receiving and/or identifying an ad-hoc operation for at least one of the plurality of UAVs, the ad-hoc operation comprising at least one of a time sensitive start time and a time sensitive end time;
identifying overlap between the ad-hoc operation and one or more operations of each of the modified time-based sequences for a corresponding UAV of the plurality of UAVs;
regenerating each of the modified time-based sequences corresponding to each of the plurality of UAVs based on the ad-hoc operation such that the identified overlap is eliminated.

Clause 10. The computer system of any of clauses 1-9, further comprising one or more displays configured to display at least one of the time-based sequence for each of the plurality of UAVs, the modified time-based sequence for each of the plurality of UAVs, and operation details for a specific operation to the operator of the plurality of UAVs.

Clause 11. A method for coordinating operations for a plurality of unmanned aerial vehicles ("UAV"), the method comprising:
generating, for each of the plurality of UAVs, a time-based sequence comprising one or more operations for a respective UAV, each of the one or more operations comprising an execution window and an estimated duration;
identifying one or more coincident time periods between a first execution window within a time-based sequence for a first UAV of the plurality of UAVs and a second execution window within a time-based sequence of a second UAV of the plurality of UAVs;
preparing a modified time-based sequence for each of the plurality of UAVs, the preparing comprising:
setting at least one of a first preferred start time ("PST") for a respective operation within the first execution window and a second PST for a respective operation within the second execution window based on at least the estimated duration of each respective operation and the coincident time periods,
wherein the setting is configured to minimize overlap between the respective operation within the first execution window and the respective operation within the second execution window; and
providing the modified time-based sequence for each of the plurality of UAVs to an operator of the plurality of UAVs.

Clause 12. The method of clause 11, wherein each execution window is bounded by an earliest start time ("EST") at which the respective operation may commence and a latest end time ("LET") by which the respective operation is to be completed.

Clause 13. The method of clause 12, wherein each of the one or more operations comprises a tentative start time ("TST") falling at or after the EST and a tentative end time ("TET") falling at or before the LET, the TST being characterized as a time sensitive start time or a time insensitive start time, and the TET being characterized as a time sensitive end time or a time insensitive end time, and
wherein the setting further comprises setting the at least one of the first PST for a respective operation within the first execution window and the second PST for the respective operation within the second execution window further based on a characterization for each of the TST and TET of the respective operations.

Clause 14. The method of clause 13, wherein the preparing comprises:
changing a PST for a first operation having a time insensitive start time within the first execution window to avoid overlap between the respective operation within the first execution window and the respective operation within the second execution window, wherein the respective operation within the second execution window has a time sensitive start time.

Clause 15. The method of any of clauses 11-14, further comprising:
receiving and/or identifying an ad-hoc operation for at least one of the plurality of UAVs, the ad-hoc operation comprising at least one of a time sensitive start time and a time sensitive end time;
identifying overlap between the ad-hoc operation and one or more operations of each of the modified time-based sequences for a corresponding UAV of the plurality of UAVs; and
regenerating each of the modified time-based sequences corresponding to each of the plurality of UAVs based on the ad-hoc operation such that the identified overlap is eliminated.

Clause 16. The method of any of clauses 11-15, wherein the functions further comprise:
determining that overlap between the ad-hoc operation and one or more operations of each of the modified time-based sequences for a corresponding UAV of the plurality of UAVs cannot be eliminated; and
transitioning responsibility of the UAV for which the ad-hoc operation was received to an operator other than the operator of the plurality of UAVs.

Clause 17. The method of any of clauses 12-16, further comprising:
receiving operator input configured to modify one or more of a duration and a PST of an operation;
determining that a complexity of the operation is greater than a threshold value and/or that the modification exceeds a threshold amount;
notifying the operator that the modification cannot be performed based on the result of the determining.

Clause 18. The method of any of clauses 12-17, further comprising:
updating each time-based sequence in real time to reflect at least one of actual start time, actual completion time, and actual duration of an operation;
recording at least one of the actual start time, actual completion time, and actual duration for each operation executed by the operator.

Clause 19. The method of clause 18, further comprising:
updating an operator record to reflect at least one of the actual start time, the actual completion time, and the actual duration for each operation in the time-based sequence; and
generating a subsequent time-based sequence based on the operator record.

While the disclosure been made with reference to examples of the implementations thereof, those skilled in the art will be able to make various modifications to the described implementations without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

The foregoing description of the disclosure, along with its associated examples, has been presented for purposes of illustration only. It is not exhaustive and does not limit the disclosure to the precise form disclosed.

All ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

What is claimed is:

1. A computer system for coordinating flight control operations for a plurality of unmanned aerial vehicles ("UAV"), the system comprising:
one or more hardware processors;
a non-transitory memory device communicatively connected to the one or more hardware processors and storing instructions that when executed by the one or more hardware processors cause the one or more hardware processors to execute functions comprising:
generating, for each of the plurality of UAVs, a time-based sequence comprising one or more flight control operations for a respective UAV, each of the one or more flight control operations comprising an execution window and an estimated duration;
identifying one or more coincident time periods between a first execution window within a first time-based sequence for a first UAV of the plurality of UAVs and a second execution window within a second time-based sequence of a second UAV of the plurality of UAVs, wherein each execution window is bounded by an earliest start time ("EST") at which the respective operation may commence and a latest end time ("LET") by which the respective operation is to be completed;
generating, in real-time, a modified time-based sequence for each of the plurality of UAVs based on the one or more coincident time periods identified, the generating comprising:
setting at least one of a first preferred start time ("PST") for a respective operation within the first execution window for the first UAV and a second PST for a respective operation within the second execution window for the second UAV based on at least the estimated duration of each respective operation and the coincident time periods,
wherein the setting is configured such that overlap between the respective operation within the first execution window and the respective operation within the second execution window is minimized; and
causing the modified time-based sequence for each of the plurality of UAVs to be displayed in real-time in a graphical user interface (GUI) generated on a computer display to an operator of the plurality of UAVs.

2. The computer system of claim 1, wherein each of the one or more flight control operations comprises a tentative start time ("TST") falling at or after the EST and a tentative end time ("TET") falling at or before the LET, the TST being characterized as a time sensitive start time or a time insensitive start time, and the TET being characterized as a time sensitive end time or a time insensitive end time, and
wherein the setting is further based on a characterization for at least one of the TST and TET of each of the respective flight control operations.

3. The computer system of claim 2, wherein each of the modified time-based sequences are provided to the operator via a graphical user interface ("GUI"), the GUI enabling customization of one or more PSTs and/or an operation duration.

4. The computer system of claim 3, wherein a time sensitive start time and a time sensitive end time are not changeable in the GUI, and wherein a time insensitive start time and a time insensitive end time are changeable in the GUI.

5. The computer system of claim 2, wherein the functions further comprise:
receiving and/or identifying an ad-hoc operation for at least one of the plurality of UAVs, the ad-hoc operation comprising at least one of a time sensitive start time and a time sensitive end time;
identifying overlap between the ad-hoc operation and one or more flight control operations of each of the modified time-based sequences for a corresponding UAV of the plurality of UAVs;
regenerating each of the modified time-based sequences corresponding to each of the plurality of UAVs based on the ad-hoc operation such that the identified overlap is eliminated.

6. The computer system of claim 1, wherein each operation in a respective time-based sequence corresponds to an operator intervention event for a respective UAV.

7. The computer system of claim 1, wherein each time-based sequence is generated from flight data corresponding to each of the plurality of UAVs.

8. The computer system of claim 7, wherein the flight data comprises one or more of UAV location, a requested flight altitude, an air traffic control ("ATC") clearance requirement, UAV type, an intended route, a trajectory profile, route trajectory change waypoints, longitudinal constraints, latitude constraints, altitude constraints, speed constraints, wind speed, and wind direction.

9. The computer system of claim 1, further comprising one or more displays configured to display at least one of the time-based sequence for each of the plurality of UAVs, the modified time-based sequence for each of the plurality of UAVs, and operation details for a specific operation to the operator of the plurality of UAVs.

10. A method for coordinating flight control operations for a plurality of unmanned aerial vehicles ("UAV"), the method comprising:
generating, for each of the plurality of UAVs, a time-based sequence comprising one or more flight control operations for a respective UAV, each of the one or more flight control operations comprising an execution window and an estimated duration;
identifying one or more coincident time periods between a first execution window within a time-based sequence for a first UAV of the plurality of UAVs and a second execution window within a time-based sequence of a second UAV of the plurality of UAVs, wherein each execution window is bounded by an earliest start time ("EST") at which the respective operation may commence and a latest end time ("LET") by which the respective operation is to be completed;
generating, in real-time, a modified time-based sequence for each of the plurality of UAVs based on the one or more coincident time periods identified, the generating comprising:
setting at least one of a first preferred start time ("PST") for a respective operation within the first execution window for the first UAV and a second PST for a respective operation within the second execution window for the second UAV based on at least the estimated duration of each respective operation and the coincident time periods,
wherein the setting is configured to minimize overlap between the respective operation within the first execution window and the respective operation within the second execution window; and
causing the modified time-based sequence for each of the plurality of UAVs to be displayed in real-time in a graphical user interface (GUI) generated on a computer display to an operator of the plurality of UAVs.

11. The method of claim 10, wherein each of the one or more flight control operations comprises a tentative start time ("TST") falling at or after the EST and a tentative end time ("TET") falling at or before the LET, the TST being characterized as a time sensitive start time or a time insensitive start time, and the TET being characterized as a time sensitive end time or a time insensitive end time, and
wherein the setting further comprises setting the at least one of the first PST for a respective operation within the first execution window and the second PST for the respective operation within the second execution window further based on a characterization for each of the TST and TET of the respective flight control operations.

12. The method of claim 11, wherein the preparing setting comprises:
changing a PST for a first operation having a time insensitive start time within the first execution window to avoid overlap between the respective operation within the first execution window and the respective operation within the second execution window, wherein the respective operation within the second execution window has a time sensitive start time.

13. The method of claim 11, further comprising:
receiving and/or identifying an ad-hoc operation for at least one of the plurality of UAVs, the ad-hoc operation comprising at least one of a time sensitive start time and a time sensitive end time;
identifying overlap between the ad-hoc operation and one or more flight control operations of each of the modified time-based sequences for a corresponding UAV of the plurality of UAVs; and
regenerating each of the modified time-based sequences corresponding to each of the plurality of UAVs based on the ad-hoc operation such that the identified overlap is eliminated.

14. The method of claim 13, wherein the functions further comprise:
determining that overlap between the ad-hoc operation and one or more flight control operations of each of the modified time-based sequences for a corresponding UAV of the plurality of UAVs cannot be eliminated; and
transitioning responsibility of the UAV for which the ad-hoc operation was received to an operator other than the operator of the plurality of UAVs.

15. The method of claim 10, further comprising:
receiving operator input configured to modify one or more of a duration and a PST of an operation;
determining that a complexity of the operation is greater than a threshold value and/or that the modification exceeds a threshold amount;
notifying the operator that the modification cannot be performed based on the result of the determining.

16. The method of claim 10, further comprising:
updating each time-based sequence in real time to reflect at least one of actual start time, actual completion time, and actual duration of an operation;
recording at least one of the actual start time, actual completion time, and actual duration for each operation executed by the operator.

17. The method of claim 16, further comprising:
updating an operator record to reflect at least one of the actual start time, the actual completion time, and the actual duration for each operation in the time-based sequence; and
generating a subsequent time-based sequence based on the operator record.

18. A non-transitory computer readable medium that stores instructions that when executed by a hardware process performs a method coordinating flight control operations for a plurality of unmanned aerial vehicles ("UAV"), the method comprising:
generating, for each of the plurality of UAVs, a time-based sequence comprising one or more flight control operations for a respective UAV, each of the one or more flight control operations comprising an execution window and an estimated duration, the execution window being bounded by an earliest start time ("EST") at which the respective operation may commence and a latest end time ("LET") by which the respective operation is to be completed;

identifying one or more coincident time periods between a first execution window within a first time-based sequence for a first UAV of the plurality of UAVs and a second execution window within a second time-based sequence of a second UAV of the plurality of UAVs;

generating, in real-time, a modified time-based sequence for each of the plurality of UAVs based on the one or more coincident time periods identified, the generating comprising:

setting at least one of a first preferred start time ("PST") for a respective operation within the first execution window for the first UAV and a second PST for a respective operation within the second execution window for the second UAV based on at least the estimated duration of each respective operation and the coincident time periods, wherein the setting is configured such that overlap between the respective operation within the first execution window and the respective operation within the second execution window is minimized; and causing the modified time-based sequence for each of the plurality of UAVs to be displayed in real-time in a graphical user interface (GUI) generated on a computer display to an operator of the plurality of UAVs.

19. The non-transitory computer readable medium of claim 18, wherein each of the one or more flight control operations comprises a tentative start time ("TST") falling at or after the EST and a tentative end time ("TET") falling at or before the LET, the TST being characterized as a time sensitive start time or a time insensitive start time, and the TET being characterized as a time sensitive end time or a time insensitive end time, and wherein the setting further comprises setting the at least one of the first PST for a respective operation within the first execution window and the second PST for the respective operation within the second execution window further based on a characterization for each of the TST and TET of the respective flight control operations.

20. The non-transitory computer readable medium of claim 19, wherein the setting comprises:

changing a PST for a first operation having a time insensitive start time within the first execution window to avoid overlap between the respective operation within the first execution window and the respective operation within the second execution window, wherein the respective operation within the second execution window has a time sensitive start time.

* * * * *